United States Patent
Halbritter et al.

(10) Patent No.: US 10,532,828 B2
(45) Date of Patent: Jan. 14, 2020

(54) APPARATUS, SYSTEMS, AND METHODS FOR AUTOMATED PART INSTALLATION

(71) Applicant: The Boeing Company, Chicago, IL (US)

(72) Inventors: Allen James Halbritter, Charleston, SC (US); Andrew Elmer Modin, Charleston, SC (US)

(73) Assignee: The Boeing Company, Chicago, IL (US)

( * ) Notice: Subject to any disclaimer, the term of this patent is extended or adjusted under 35 U.S.C. 154(b) by 256 days.

(21) Appl. No.: 15/640,024

(22) Filed: Jun. 30, 2017

(65) Prior Publication Data

US 2019/0002132 A1 Jan. 3, 2019

(51) Int. Cl.
| | | |
|---|---|---|
| *B64F 5/50* | (2017.01) | |
| *B25J 15/00* | (2006.01) | |
| *B64C 1/06* | (2006.01) | |
| *B64F 5/10* | (2017.01) | |
| *B29C 65/00* | (2006.01) | |
| *B29C 70/00* | (2006.01) | |
| *B29C 70/54* | (2006.01) | |

(Continued)

(52) U.S. Cl.
CPC ............. *B64F 5/50* (2017.01); *B25J 15/0004* (2013.01); *B25J 15/0052* (2013.01); *B25J 15/0616* (2013.01); *B29C 31/08* (2013.01); *B29C 66/124* (2013.01); *B29C 70/00* (2013.01); *B29C 70/54* (2013.01); *B64C 1/064* (2013.01); *B64F 5/10* (2017.01); *B29L 2031/3076* (2013.01); *B29L 2031/3082* (2013.01)

(58) Field of Classification Search
CPC ..... B23P 19/002; B23P 19/007; B23P 19/008; B23P 19/102; B23P 19/105; B23P 19/12; B64F 5/50
See application file for complete search history.

(56) References Cited

U.S. PATENT DOCUMENTS 3,984,006 A * 10/1976 Takeyasu ............. B23P 19/105
  414/589
4,702,667 A   10/1987 Hounsfield et al.
(Continued)

FOREIGN PATENT DOCUMENTS

EP         2133263 A2    12/2009
WO    2013/153537 A2    10/2013

*Primary Examiner* — Jason L Vaughan
(74) *Attorney, Agent, or Firm* — Dascenzo Intellectual Property Law, P.C.

(57) ABSTRACT

Apparatus, systems, and methods for placing a part may automatically self-align the part relative to a target along multiple axes of movement, such as along the width of the part, and normal to one or more target surfaces of the target. Devices may include one or more installation heads each having a respective retaining portion configured to selectively support and retain the part in association with the respective installation head as the device moves the part from a first location located apart from the target, towards the target. The installation head may be configured to automatically align the part with the target, in response to engagement between one or more part surfaces of the part and one or more target surfaces of the target. The retaining portion may be configured to selectively release the part once the part is automatically aligned with and operatively at the target.

17 Claims, 7 Drawing Sheets

(51) Int. Cl.
  *B29C 31/08* (2006.01)
  *B25J 15/06* (2006.01)
  *B29L 31/30* (2006.01)

(56) References Cited

U.S. PATENT DOCUMENTS

| | | |
|---|---|---|
| 4,980,013 A | 12/1990 | Lowery |
| 6,021,579 A | 2/2000 | Schimmels et al. |
| 7,993,565 B2 | 8/2011 | Kim et al. |
| 9,199,417 B1 | 12/2015 | Rotter et al. |
| 9,221,235 B1 | 12/2015 | Rotter et al. |
| 9,221,236 B1 | 12/2015 | Rotter et al. |
| 9,272,495 B1 | 3/2016 | Robins et al. |
| 2001/0018804 A1* | 9/2001 | Won .................... B23P 19/102 33/644 |
| 2006/0231981 A1 | 10/2006 | Lee et al. |
| 2006/0288808 A1 | 12/2006 | Anderson et al. |
| 2009/0320292 A1 | 12/2009 | Brennan et al. |
| 2010/0102482 A1 | 4/2010 | Jones et al. |
| 2010/0139857 A1 | 6/2010 | Pham et al. |
| 2013/0174396 A1 | 7/2013 | Torres Martinez |
| 2015/0314892 A1* | 11/2015 | DesJardien ............... B64F 5/50 29/559 |
| 2016/0075092 A1 | 3/2016 | Wilcoxson et al. |

\* cited by examiner

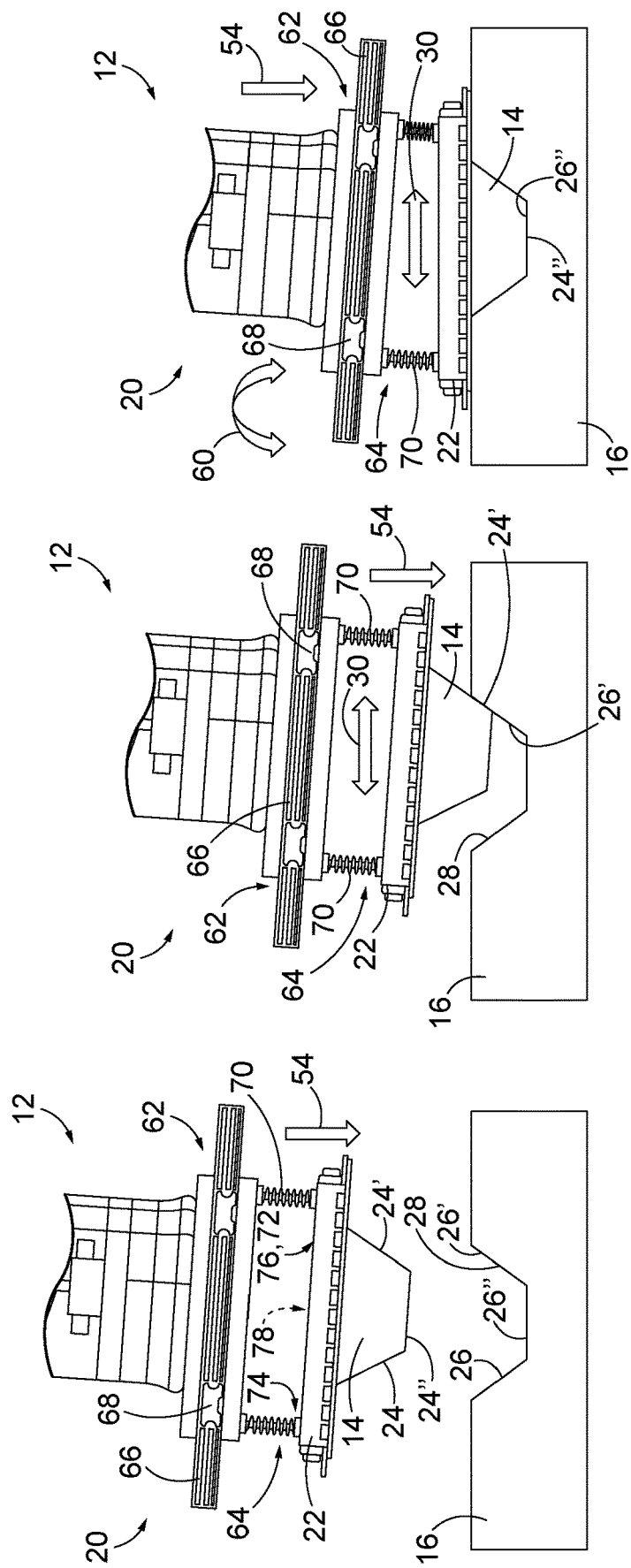

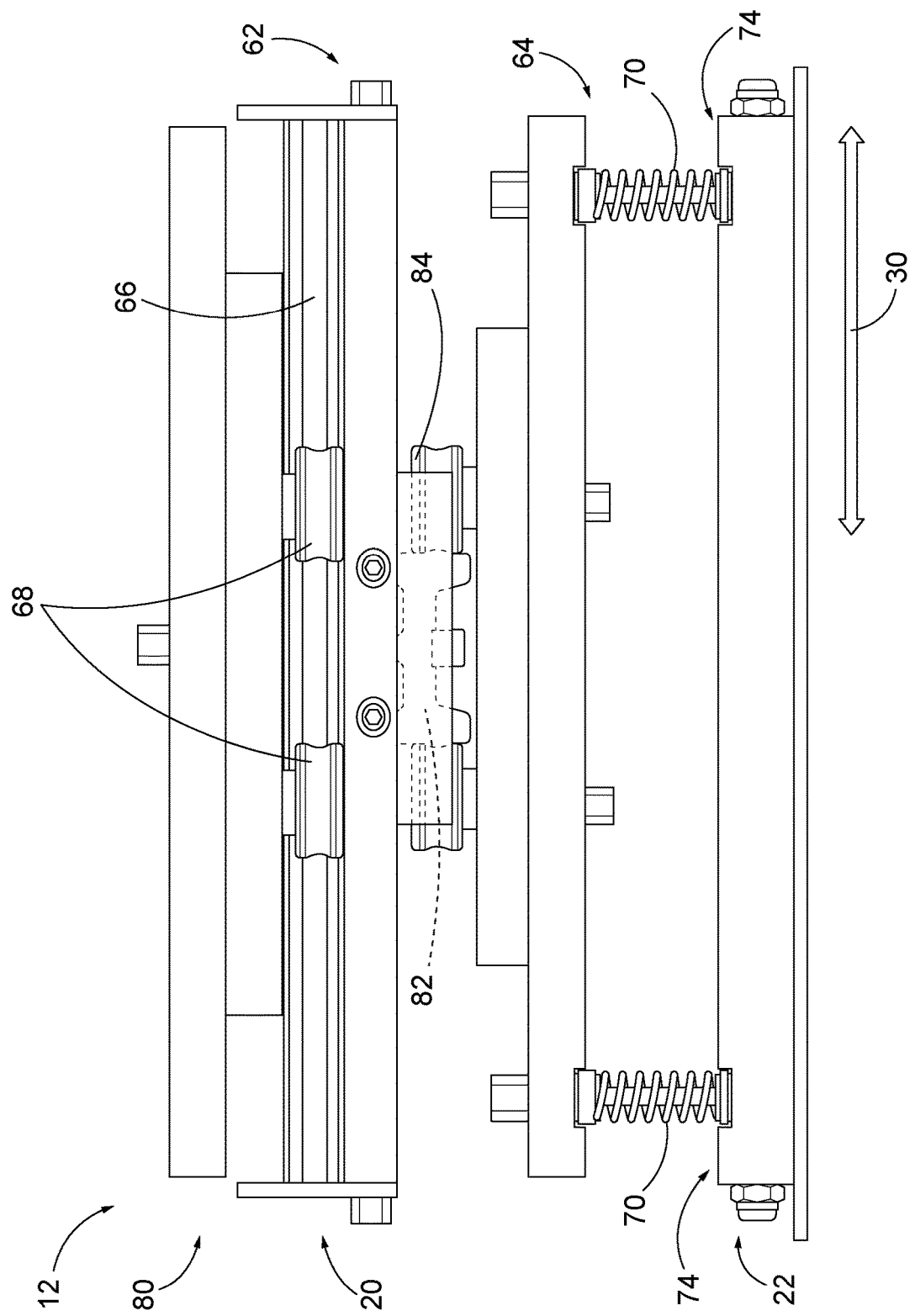

APPARATUS, SYSTEMS, AND METHODS FOR AUTOMATED PART INSTALLATION

FIELD

The present disclosure relates to apparatus, systems, and methods for automated part installation.

BACKGROUND

Stiffened composite structures are structures that are constructed of composite materials, such as fiber reinforced composite materials, and typically include some form of structural frame that carries a skin. Some modern aircraft fuselages are examples of stiffened composite structures that include a skin operatively coupled to frame members that extend circumferentially around and that are spaced longitudinally along the inside of the fuselage, and stringers that extend longitudinally along and that are spaced circumferentially around the inside of the fuselage. Some stiffened composite fuselages are constructed utilizing an inner mold line layup mandrel that includes stringer cavities, troughs, or forms, that extend longitudinally along the mandrel. To prepare the mandrel, resin may be hand-applied to the stringer cavities, and stringers may be hand-aligned into position in the stringer cavities.

In these and other manufacturing processes, parts are often transported from one location to another manually, often requiring multiple people to handle and move the part. For example, five or more people may be required to move and/or install large and/or long parts, such as stringers for aircraft, which can be up to 30-50 feet long (9.1-15.2 meters), or even longer. Such manual tasks may result in bending or twisting of the part as it is moved, which can result in damage to the part, or improper placement at the desired location. In some cases, wrinkling and structural defects may result in the cured part as a result of such bending or twisting (e.g., for composite parts that are cured after placement or installation with respect to a mold or other lay-up structure). Utilization of vision systems for placement and alignment of parts can be costly and complex to implement.

SUMMARY

Presently disclosed apparatus and systems may provide for self-aligning placement of a part, without the use of a vision system. Apparatus according to the present disclosure may include an installation head and a retaining portion configured to selectively support and retain the part in association with the installation head as the apparatus moves the part from a first location towards a target and installs or places the part with respect to the target. The installation head may be configured to provide multiple axes of movement of the part relative to a target such that the installation head is configured to automatically align the part with respect to the target responsive to engagement between one or more part surfaces of the part and one or more target surfaces of the target. The retaining portion may be configured to selectively release the part once the part is automatically aligned with and operatively at the target.

Presently disclosed methods for placing a part may include engaging the part with a retaining portion via an installation head, transferring the part from a first location towards a target, automatically aligning the part with the target as the part is placed with respect to the target responsive to engagement between one or more part surfaces of the part and one or more target surfaces of the target, and releasing the part from the retaining portion to place the part at the target. Generally, the engaging the part is performed while the part is located at the first location, and the releasing the part is performed after the automatically aligning the part with respect to the target. Such presently disclosed apparatus, systems, and methods may be configured to hold, move, and install, for example, aircraft stringers and other difficult-to-handle parts using automation, but without requiring an excessive number of programmable axes and/or a vision system (though some examples may include or be used in conjunction with a vision system).

BRIEF DESCRIPTION OF THE DRAWINGS

FIG. 4 is a schematic representation of a portion of a device for placing a part, approaching a target.

FIG. 5 is a schematic representation of the portion of the device of FIG. 4, making contact with the target.

FIG. 6 is a schematic representation of the portion of the device of FIGS. 4-5, illustrating alignment of the part with the target.

FIG. 7 is an elevation view of one example of an installation head and retaining portion, according to the present disclosure.

DESCRIPTION

Figure 1:
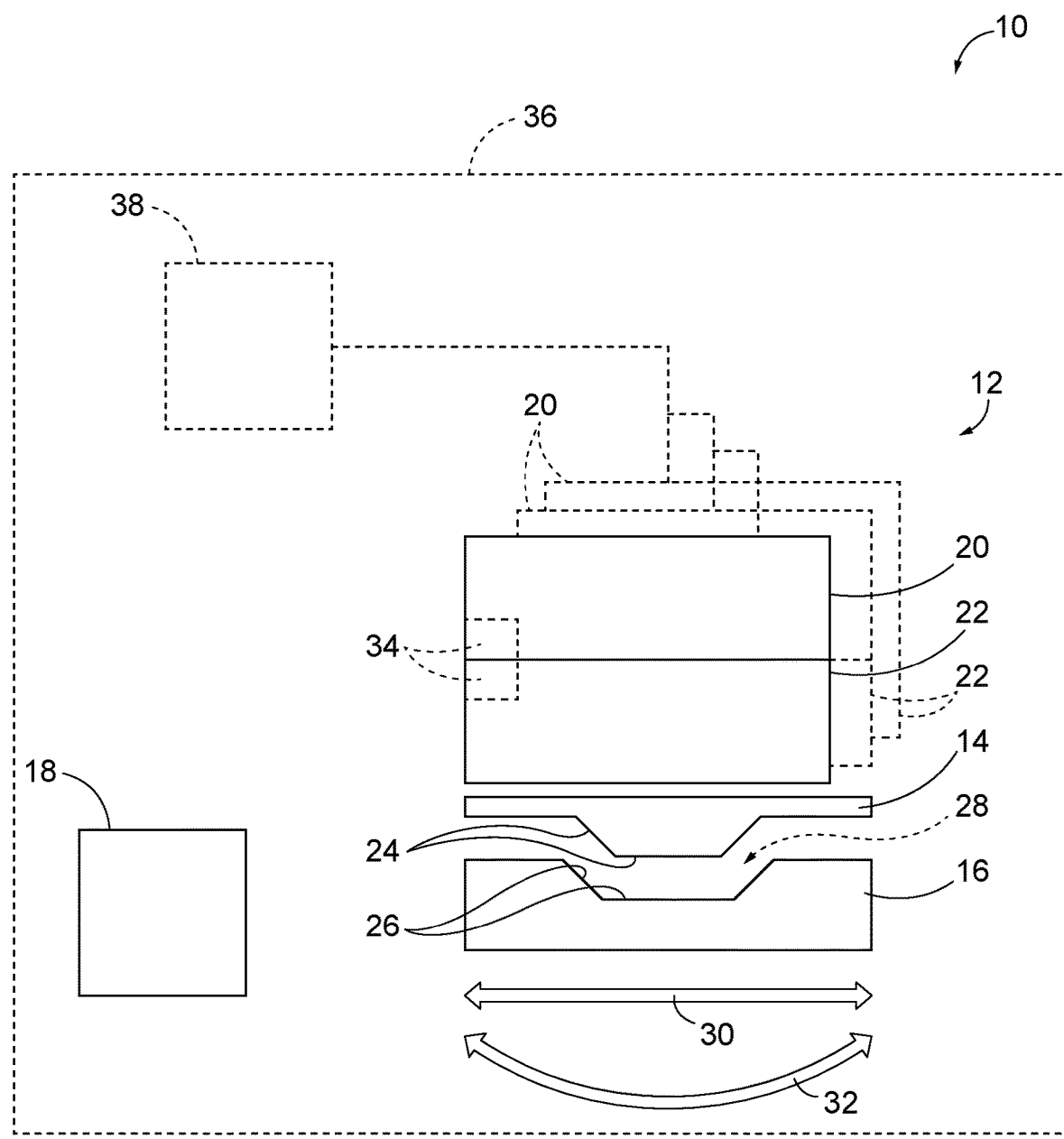
FIG. 1 is a schematic representation of systems for placing a part, according to the present disclosure.

Presently disclosed apparatus and systems may provide for self-aligning placement of a part, with FIG. 1 illustrating non-exclusive examples of such systems 10 in a schematic elevation view. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Systems 10 generally include an apparatus, or device, 12 that is configured to place a part 14 with respect to a target 16 (e.g., device 12 may be configured to place part 14 at, on, in, against, and/or adjacent target 16). Device 12 is configured to move part 14 from a first location 18 towards target 16. For example, first location 18 may be a tool, a storage structure, or other location located apart from target 16 at which part 14 is initially located, and device 12 may be configured to move part 14 from first location 18 to target 16 and self-align part 14 with at least a portion of target 16. Once part 14 is aligned with respect to target 16 and operatively at target 16, device 12 is configured to selectively release part 14. Devices 12 and systems 10 may thus be used for any pick-and-place manufacturing steps, and/or for any manufacturing or processing steps involving movement of a part from a first location towards a target.

Device 12 generally includes at least one installation head 20 and at least one corresponding retaining portion 22. Installation head 20 is configured to provide multiple axes of self-aligning movement of part 14 relative to target 16, such that installation head 20 facilitates automatic (e.g., passive) self-alignment of part 14 with respect to target 16, responsive to engagement between one or more part surfaces 24 of part 14 and one or more target surfaces 26 of target 16. As used herein, movement is said to be "self-aligning" when the device and the part move with respect to target 16 to align part 14 with target 16, said movement occurring without requiring input from an operator or requiring feedback from a vision system, and said movement occurring automatically and in response to contact between part 14 and target 16. Retaining portion 22 is configured to selectively support and retain part 14 in association with installation head 20 as part 14 is moved from first location 18 towards target 16, and to selectively release part 14 after part 14 has been moved by device 12 and is operatively at target 16. Part 14 is considered to be "operatively at" target 16 when part 14 is in a desired position, location, and/or orientation with respect to target 16. For example, part 14 is operatively at target 16 when it is at, in, and/or on target 16 (e.g., at, in, and/or on a cavity 28 or other portion of target 16), such that at least one of the part surfaces 24 is in contact with at least one of the target surfaces 26. Part 14 also is operatively at target 16 when it is within an operative range with respect to target 16, such that part 14 may be released from retaining portion 22 before being engaged with (e.g., contacting) target 16, such as such that one or more part surfaces 24 contact or engage with one or more target surfaces 26 after release of part 14 from device 12.

Some systems 10 may include a single installation head 20 and a single retaining portion 22. Other systems 10 may include a single installation head 20 with a plurality of retaining portions 22 associated therewith, or a plurality of installation heads 20 with a single retaining portion 22 associated therewith. Still other systems 10 include a plurality of installation heads 20 and a plurality of retaining portions 22, each respective installation head 20 having a corresponding respective retaining portion 22 associated therewith. For example, devices 12 may include at least two installation heads 20 (and/or at least two retaining portions 22), at least three installation heads 20 (and/or at least three retaining portions 22), at least four installation heads 20 (and/or at least four retaining portions 22), at least five installation heads 20 (and/or at least five retaining portions 22), at least six installation heads 20 (and/or at least six retaining portions 22), at least eight installation heads 20 (and/or at least eight retaining portions 22), at least 10 installation heads 20 (and/or at least 10 retaining portions 22), at least 15 installation heads 20 (and/or at least 15 retaining portions 22), and/or at least 20 installation heads 20 (and/or at least 20 retaining portions 22).

Each respective installation head 20 and corresponding retaining portion 22 may be coupled together, or may be integrally formed with one another. As used herein, a given retaining portion 22 is "associated with" a given installation head 20 if the retaining portion 22 imparts movement to at least a portion of part 14 being supported and/or retained by the retaining portion 22, said movement corresponding to movement of installation head 20, and said movement being with respect to target 16. For example, a given retaining portion 22 may be substantially fixed with respect to the given installation head 20 it is associated with, such that any movement of installation head 20 with respect to target 16 also results in substantially equivalent movement of retaining portion 22 with respect to target 16.

In systems 10 having a plurality of installation heads 20, respective installation heads 20 may be spaced apart from one another, such as along a length of part 14. In some systems 10, such as systems 10 configured to move parts 14 that are elongated, the plurality of installation heads 20 may be arranged with respect to one another such that they are configured to minimize twisting of part 14 about a longitudinal axis of part 14 as it is moved from first location 18 towards target 16. Additionally or alternatively, in some systems 10 having a plurality of installation heads 20, each respective installation head 20 is configured to move relative to and to articulate independently of the other respective installation heads 20. Respective installation heads 20 may be linked together while still being configured to independently articulate, in some examples. For example, device 12 may be configured to selectively move a plurality of installation heads 20 together, relative to part 14 (e.g., when part 14 is not retained by retaining portion 22, such as when device 12 is picking up or otherwise obtaining part 14 from first location 18), relative to first location 18, and/or relative to target 16 (e.g., as device 12 is moving part 14 towards target 16, or as device 12 is moving away from target 16 after having placed part 14).

Device 12 is configured to self-align part 14 with respect to target 16 by providing aligning movement of part 14 with respect to target 16. For example, as part 14 is being placed with respect to target 16, installation head 20 provides multiple axes of movement of part 14 with respect to target 16, with said multiple axes of movement of part 14 being lateral and/or longitudinal movement (e.g., translation), and/or rotational movement (e.g., roll, pitch, and/or yaw) with respect to target 16. In some examples, device 12 is configured such that contact between one or more part surfaces 24 and one or more target surfaces 26 causes self-aligning movement of part 14 with respect to target 16 along a first axis, or dimension, of part 14. For example, device 12 may be configured such that contact between one or more part surfaces 24 and one or more target surfaces 26 causes self-aligning movement of part 14 along a width of part 14 (e.g., in the directions indicated by arrow 30). Additionally or alternatively, device 12 may be configured such that contact between one or more part surfaces 24 and one or more target surfaces 26 causes self-aligning movement of part 14 along a second axis or dimension of part 14, such as along the length of part 14 (e.g., perpendicular to the directions indicated by arrow 30). Additionally or alternatively, device 12 may be configured such that contact between one or more part surfaces 24 and one or more target surfaces 26 causes self-aligning rotation of part 14, such as pitch, roll (indicated by arrow 32), and/or yaw of part 14 with respect to target 16. In this manner, device 12 may be configured to allow self-aligning movement of part 14 in a direction normal to at least one of target surfaces 26. Thus, installation head 20 may be configured to provide at least 3 degrees of freedom, at least 4 degrees of freedom, at least 5 degrees of freedom, and/or at least 6 degrees of freedom to self-align part 14 with respect to target 16. To facilitate such self-aligning movement of part 14, installation head 20 may include any suitable structures, such as one or more linear bearing rails, one or more ball-and-socket joints, one or more pivot points, one or more hinges, one or more air cylinders, and/or one or more compression springs.

In some examples, device 12 is configured to selectively and releasably lock part 14 into position by selectively substantially preventing self-aligning movement of installation head 20. For example, device 12 (e.g., installation head 20 and/or retaining portion 22) may include a locking mechanism 34 configured to selectively substantially prevent movement of installation head 20 (e.g., translation and/or rotation of installation head 20 relative to target 16). Locking mechanism 34 may include any suitable structure or mechanism, such as locking air cylinders, fasteners, clasps, clips, latches, grooves, channels, ratchets, cams, and/or hinges. Locking mechanism 34 may be selectively unlocked (e.g., disengaged) to allow self-aligning movement of installation head 20 and retaining portion 22. For example, locking mechanism 34 may be engaged (e.g., locked) while device 12 transports part 14 towards target 16, while locking mechanism 34 may be disengaged while part 14 self-aligns with target 16. In some systems 10, locking mechanism 34 may be disengaged before, after, or in conjunction with contact between target 16 and part 14 during self-alignment of part 14. For example, locking mechanism 34 may be selectively disengaged above first location 18 and/or above target 16, such as before installation head 20 is moved towards first location 18 to pick up part 14 and/or before installation head 20 is moved towards target 16 to self-align part 14 with target 16.

Systems 10 may include a support structure 36, which may be configured to support device 12 (e.g., one or more installation heads 20 and one or more retaining portions 22). In some examples, support structure 36 additionally or alternatively supports target 16 and/or part 14 (e.g., before part 14 is retained by retaining portion 22 of device 12). Support structure 36 may span the distance between first location 18 and target 16. In some examples, first location 18 may be located in or on support structure 36. Support structure 36 may include a linear bearing rail structure that is configured to facilitate movement of device 12 from first location 18 towards target 16. For example, installation head 20 and retaining portion 22 may be mechanically linked to support structure 36 such that support structure 36 allows movement of installation head 20 and retaining portion 22 together, which may be relative to part 14, such as along the length and/or width of part 14, as well as together with part 14, once device 12 obtains part 14 from first location 18. Generally, support structure 36 remains substantially stationary with respect to target 16, while device 12 moves part 14 from first location 18 towards target 16 (e.g., device 12 moves with respect to support structure 36 in some examples). Retaining portion 22 and/or installation head 20 pivot with respect to support structure 36, in some systems 10.

Retaining portion 22 may selectively and releasably retain part 14 via any suitable mechanism. In some systems 10, retaining portion 22 includes a vacuum platen that is configured to draw a vacuum, thereby drawing part 14 into or against retaining portion 22 to retain part 14. Additionally or alternatively, retaining portion 22 may include a suction device, a gripper, a latch, a groove, a vacuum device, and/or any other mechanism configured to selectively and temporarily retain the part to the retaining portion.

Device 12 may be configured to operatively move part 14 to target 16, such as by translating and/or rotating part 14 with respect to target 16. Device 12 may install part 14 at, in, and/or on target 16, place part 14 at, on, and/or in target 16, and/or secure or couple part 14 to target 16. Device 12 is generally configured to obtain or pick up part 14 in any of a plurality of different orientations from first location 18. As part 14 is self-aligned with respect to target 16 via device 12, device 12 may apply substantially uniform downward compactive loading to part 14, towards at least one target surface 26, to self-normalize part 14 with respect to target 16 and, in some cases, seat part 14 within cavity 28 of target 16. Device 12 is generally configured to transfer a plurality of parts 14 from first location 18 to or towards target 16. In some examples, device 12 picks up a first part 14 from first location 18, transfers the first part 14 to or towards target 16, and then is returned to first location 18 to pick up a second respective part 14, which is then transferred to target 16. In this manner, device 12 may pick up a plurality of respective parts 14, sequentially, moving each respective part 14 towards target 16 and aligning each respective part 14 with target 16, such as with a respective cavity 28 or trough formed in target 16. In some examples, device 12 may include a reset mechanism configured to re-center installation head 20 after transporting a first respective part 14, and prior to transporting a second respective part 14. For example, in systems 10 including one or more linear bearing rail systems (e.g., first linear bearing rail 66 and first set of bearings 68 engaged therewith, illustrated in the examples of FIGS. 4-6) for self-aligning movement of installation head 20, device 12 may include such a reset mechanism (e.g., formed of springs and/or rubber bands) that is configured to re-center installation head 20 with respect to the linear bearing rail system, between transporting each subsequent respective part 14.

Device 12 may be mounted on or operatively coupled to an automated or semi-automated piece of equipment 38, which may control movement of device 12. In some examples, device 12 may be numerically controlled. In some examples, an industrial robot or other piece of equipment 38 may be configured to selectively move device 12 (and part 14, when retained by device 12) between first location 18 and target 16. As part 14 is moved towards target 16 and aligned with target 16, part 14 may be moved with respect to target 16, such as moved along the length of the part (e.g., along the longitudinal axis of part 14), moved along the width of the part, and/or rotated and/or pivoted with respect to target 16. In some systems 10, device 12 may include one or more base supports positioned along the length of part 14 to restrict or prevent twisting of part 14 about the longitudinal axis, during movement of part 14.

Part 14 may be any type of part. In some systems 10, part 14 is a composite structure or laminate. In some examples, part 14 is a partially cured composite structure (e.g., a "green" part). Part 14 may be semi-flexible, semi-rigid, rigid, or flexible. In some systems 10, part 14 is an elongated part that may be at least 5 feet long (1.5 meters), at least 10 feet long (3 meters), at least 15 feet long (4.5 meters), at least 20 feet long (6 meters), at least 30 feet long (9 meters), and/or at least 50 feet long (15 meters). Part 14 may have any suitable cross-sectional area, with one specific example having a substantially trapezoidal cross-sectional area. For example, one or more part surfaces 24 may be angularly arranged at non-perpendicular and non-parallel angles with respect to one another. In other examples, part 14 may have a circular, elliptical, oval, polygonal, and/or irregular or amorphous cross-sectional area. Part 14 may include one or more three-dimensional contours along the length of part 14. In some systems 10, part 14 is a stringer for an aircraft, though part 14 is not limited to the same.

Target 16, in some examples, is an assembly for an aircraft, such as a fuselage or other assembly used for manufacturing an aircraft or other vehicle. Target 16 may be a mold or tool for an aircraft or other vehicle. For example, target 16 is a mandrel for assembling an aircraft fuselage in some examples. Target surfaces 26 of target 16 (e.g., of cavity 28 of target 16) may be complementary to part surfaces 24 of part 14 being positioned therein. In this manner, target 16 may be configured to receive part 14 within cavity 28. In one specific example, target 16 may be a stringer trough configured to receive part 14. Cavity 28 may be defined by one or more target surfaces 26 of target 16 and has a substantially trapezoidal cross-sectional area in some examples, though cavity 28 may have a circular, elliptical, oval, polygonal, and/or irregular or amorphous cross-sectional area in other examples. Target 16 may include a plurality of respective cavities 28 for receiving a plurality of respective parts 14.

Figure 2:
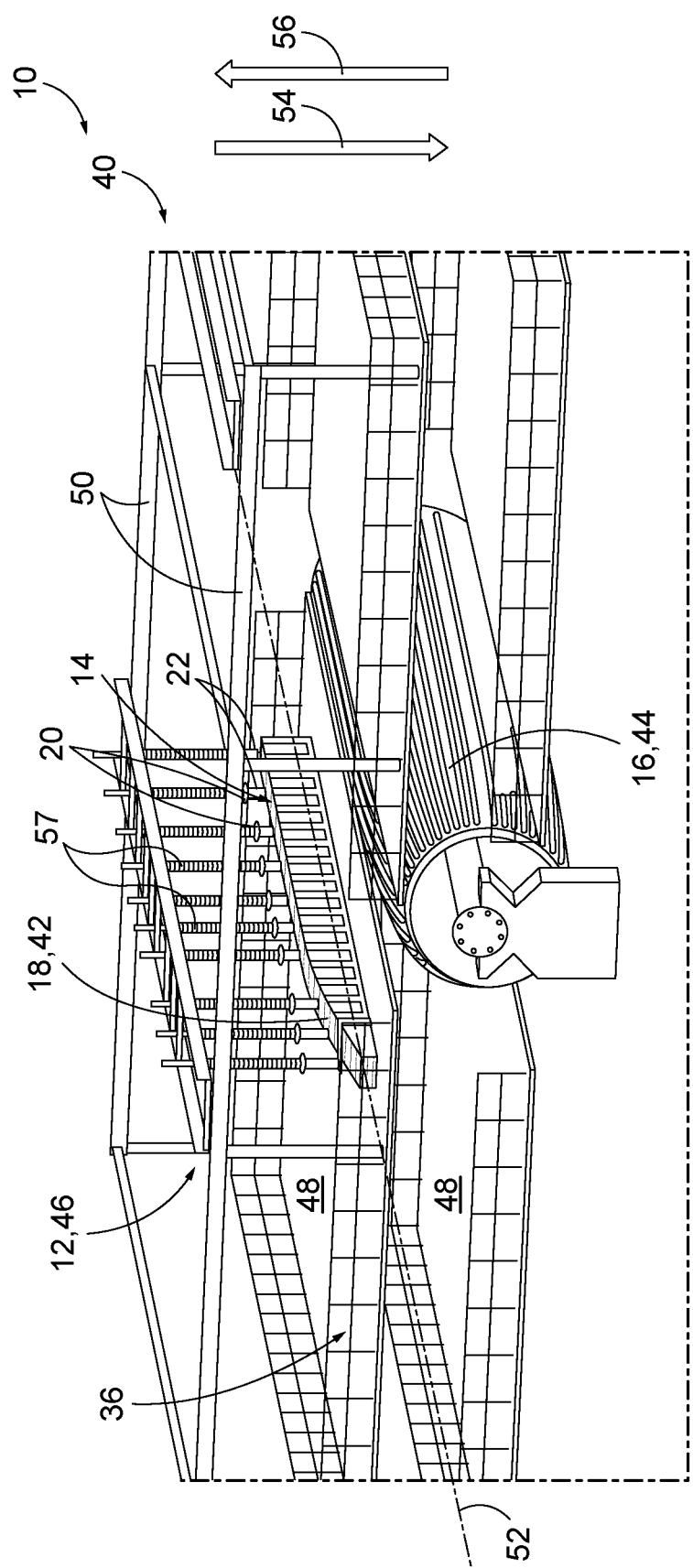
FIG. 2 is an example of a system for placing a part, according to the present disclosure.
Figure 3:
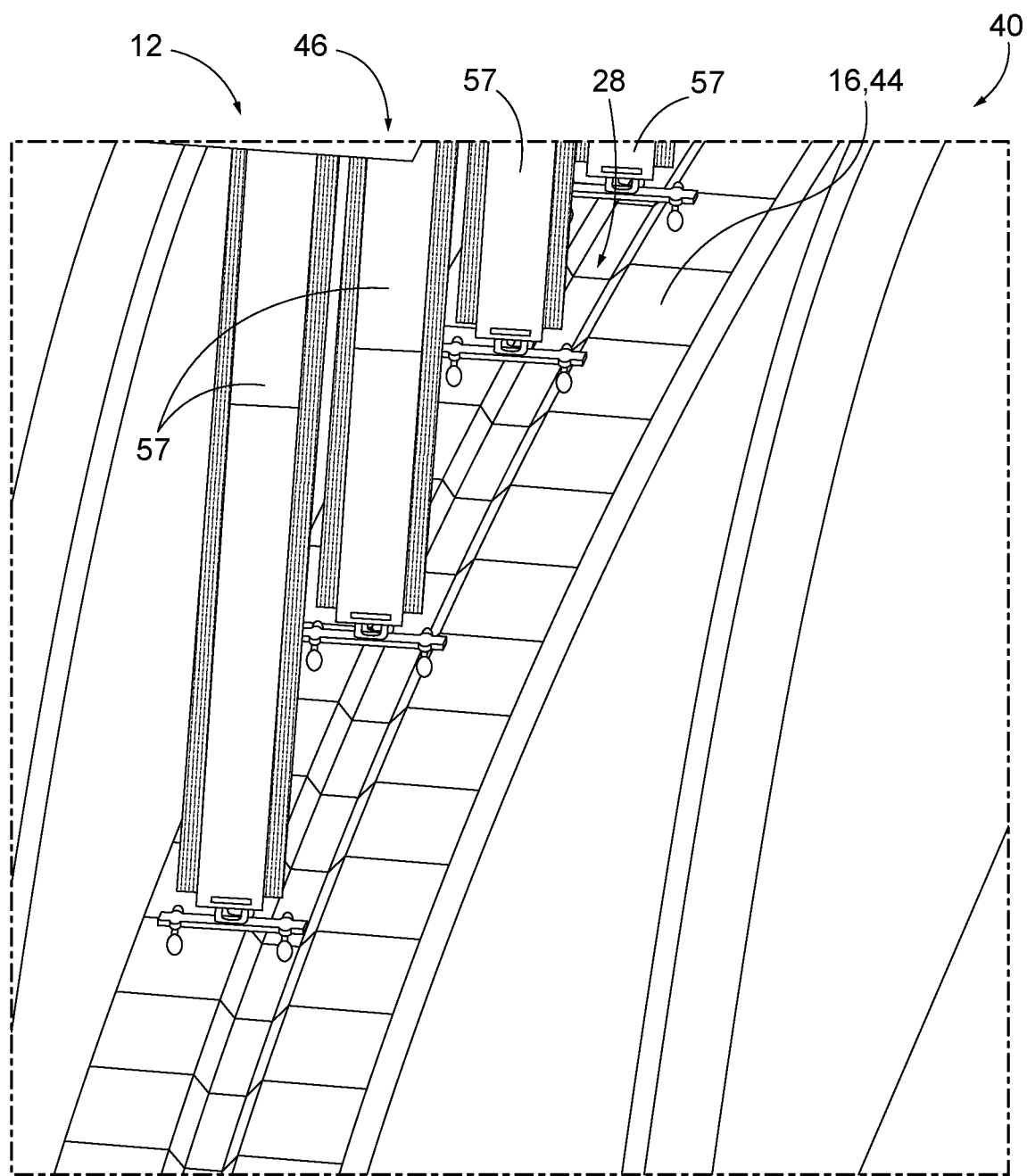
FIG. 3 is a close-up view of a portion of a system for placing a part, according to the present disclosure.

Turning now to FIGS. 2-3, illustrative non-exclusive examples of systems 10 in the form of system 40 are illustrated. Where appropriate, the reference numerals from the schematic illustration of FIG. 1 are used to designate corresponding parts of system 40, however, the example of FIGS. 2-3 is non-exclusive and does not limit systems 10 to the illustrated embodiments of system 40. That is, systems 10 are not limited to the specific embodiments of the illustrated system 40, and systems 10 may incorporate any number of the various aspects, configurations, characteristics, properties, etc. that are illustrated in and discussed with reference to the schematic representation of FIG. 1 and/or the embodiment of FIGS. 2-3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to system 40, however, it is within the scope of the present disclosure that the previously discussed features, variants, etc. may be utilized therewith.

FIGS. 2-3 illustrate an example of system 10, in the form of system 40, having device 46 (which is an example of device 12) supported by support structure 36, a mold or tool 42 at first location 18, and target 16 in the form of a layup mandrel 44 for an aircraft fuselage. In system 40, support structure 36 is configured to support both device 46 and tool 42, and forms a framework or scaffolding around layup mandrel 44. In some examples, target 16 (e.g., layup mandrel 44) may be supported by support structure 36, or by a separate support structure. In the example of system 40, tool 42 and layup mandrel 44 remain substantially stationary with respect to support structure 36, while device 46 moves part 14 from tool 42 to layup mandrel 44, thereby moving part 14 relative to support structure 36. Support structure 36 includes a plurality of platforms 48 and rails 50 in this example, though other configurations are also within the scope of the present disclosure.

Device 46 includes a plurality of installation heads 20 each having a respective retaining portion 22 associated therewith. As shown, installation heads 20 are spaced apart from each other, along the length of part 14 (e.g., along a longitudinal axis 52 of part 14). In operation, device 46 selectively lowers the plurality of installation heads 20 towards part 14 at tool 42 (e.g., in the direction indicated by arrow 54), such as in response to an operator command, or in response to automated instructions. As the plurality of retaining portions 22 engage or contact part 14, installation heads 20 self-align with and obtain or pick up part 14 from tool 42, selectively retaining and supporting the part as installation heads 20 are vertically raised away from tool 42 (e.g., in the direction indicated by arrow 56) while part 14 is retained by retaining portions 22. Device 46 is then moved (e.g., manually moved, automatically moved, or semi-automatically moved), such as along rails 50, towards layup mandrel 44. When appropriately positioned, installation heads 20 may then be lowered (along arrow 54) towards layup mandrel 44 while retaining part 14 via retaining portions 22. When part 14 is operatively positioned at layup mandrel 44, device 46 selectively releases part 14. In the example of system 40, tool 42 (first location 18) is located at a different vertical height than is layup mandrel 44 (target 16), but in other examples of systems 10 and/or systems 40, first location 18 and target 16 may be arranged differently with respect to one another, such that the raising and/or lowering of device 12 towards and/or away from target 16 and/or first location 18 may be increased, decreased, and/or eliminated, depending on the relative arrangement of first location 18 and target 16.

In examples of device 12, 46 having a locking mechanism 34 (FIG. 1), locking mechanism 34 may be configured to selectively (e.g., when engaged) prevent self-aligning movement of installation head 20, and to again allow self-aligning movement of installation head 20 when selectively disengaged (e.g., unlocked). Installation head 20 may be locked into position with respect to layup mandrel 44 and/or tool 42 when transporting part 14 towards layup mandrel 44, and unlocked at any desired point during transportation and/or installation of part 14 with respect to target 16 (e.g., layup mandrel 44). For example, installation head 20 may be unlocked outside the tool 42 and/or layup mandrel 44 (e.g., above, or outside the tool detail), such as before being lowered towards the same to pick up part 14 from tool 42 or to place part 14 at layup mandrel 44. Additionally or alternatively, installation head 20 may be unlocked while within the tool detail of tool 42 and/or layup mandrel 44, either with or without touching or contacting tool 42, part 14, and/or layup mandrel 44.

FIG. 3 illustrates a close-up of a portion of system 40 of FIG. 2, illustrating a portion of elongated cavity 28 of layup mandrel 44. As shown in FIG. 3, cavity 28 may have a three-dimensional contoured shape, with yaw, pitch, and roll curvature along a length of cavity 28. Also visible in FIG. 3 are a plurality of extensions 57 that extend down from support structure 36 (FIG. 2). While not shown in FIG. 3, for clarity, each extension 57 may have a respective installation head 20 and retaining portion 22 coupled thereto. As shown in FIG. 3, each respective extension 57 may be selectively lowered towards cavity 28, with different respective extensions 57 being lowered different amounts, due to the curvature of cavity 28. In this manner, installation head 20 and associated retaining portion 22 and part 14 may be lowered into and placed in cavity 28 by lowering extensions 57 towards target 16.

FIGS. 4-6 schematically illustrate self-alignment of part 14 within cavity 28 of target 16. In the sequence shown in FIGS. 4-6, as installation head 20 is lowered towards target 16 (in the direction indicated by arrow 54), installation head 20 is moved in a plurality of different directions (and along a plurality of different axes), as one or more part surfaces 24 of part 14 (e.g., part surface 24, 24', and/or 24") contact one or more target surfaces 26 of target 16 (e.g., target surface 26, 26', and/or 26"), thereby aligning part 14 with cavity 28 along the length of part 14. FIG. 4 illustrates part 14 being lowered towards cavity 28. FIG. 5 illustrates a first part surface 24' contacting a first target surface 26', which engagement causes installation head 20 and part 14 to translate along the width of part 14 (in the direction indicated by arrow 30), thereby self-aligning part 14 with cavity 28. For example, the one or more part surfaces 24 may be angularly arranged, such that during lowering of installation head 20 the angularly arranged part surface 24 is configured to contact the complimentary angled target surface 26 and cause displacement of part 14 relative to target 16 along the surface of contact between the angular part surface 24 and target surface 26. Accordingly, the contact between the angular part surface 24 and angular target surface 26 causes a displacement of installation head 20 and part 14 (transverse to the direction in which the installation head is lowered) towards a centered alignment with target 16.

FIG. 6 illustrates self-normalization of part 14 with respect to cavity 28, via roll of installation head 20 with respect to target 16, as indicated by arrow 60. Roll of installation head 20 with respect to target 16 may be caused by contact between a lower part surface (e.g., second part surface 24") and one or more target surfaces, such as second target surface 26", as part 14 is aligned within cavity 28. While part 14 and cavity 28 are illustrated with trapezoidal cross-sectional areas in these figures, other examples may include parts 14 and cavities 28 with cross-sectional areas of other shapes, such as polygonal, circular, oval, elliptical, and/or irregular or amorphous cross-sectional areas.

Device 12 (e.g., installation head 20 of device 12) may include one or more mechanisms for self-aligning part 14 with target 16 (e.g., cavity 28 of target 16). For example, a first mechanism 62 may be configured to facilitate self-aligning movement of installation head 20 along or about a first dimension of part 14 (e.g., along arrow 30), while a second mechanism 64 may be configured to facilitate self-aligning movement of installation head 20 along or about a second dimension of part 14 (e.g., roll of part 14, about the longitudinal axis of part 14, as indicated by arrow 60). First mechanism 62 and/or second mechanism 64 of installation head 20 may thus provide a plurality of axes of movement of installation head 20 (and part 14 when engaged therewith). In some examples, device 12 may include one or more additional mechanisms for additional axes of self-aligning movement, and/or one or more mechanisms may be configured to facilitate self-aligning movement of installation head 20 along more than one axis or dimension of part 14.

First mechanism 62 may be, for example, a first linear bearing rail 66 and a first set of bearings 68 engaged with first linear bearing rail 66, such that movement of first set of bearings 68 along first linear bearing rail 66 facilitates self-aligning movement of installation head 20 along the first dimension (e.g., in the directions indicated by arrow 30). In other examples, first mechanism 62 may include any different or similar structure that allows for the desired self-aligning movement, such as a sliding mechanism or a different bearing rail system. In the illustrated examples, first mechanism 62 is configured to self-align part 14 substantially along the width of part 14. Additionally or alternatively, first mechanism 62 may be configured to self-align part 14 substantially along the length of part 14, depending on the configuration of first mechanism 62 and its arrangement relative to part 14. For example, first linear bearing rail 66 may be arranged substantially parallel to the width of part 14, as illustrated. In other examples, first linear bearing rail 66 may be arranged in a different orientation with respect to part 14, such as substantially parallel to a length of part 14, or arranged at a different angle with respect to part 14.

Second mechanism 64 may include, for example, a plurality of compression springs 70, which may extend from installation head 20 to retaining portion 22. In some examples, second mechanism 64 (e.g., compression springs 70) couples retaining portion 22 to installation head 20. Second mechanism 64 may be configured to self-normalize at least one part surface 24 of part 14 with respect to at least one target surface 26 of target 16 when second mechanism 64 is engaged. For example, compression springs 70 may be biased to push retaining portion 22 away from installation head 20, but may be configured to compress when one or more part surfaces 24 contact one or more target surface 26, as shown in FIG. 6. In this manner, retaining portion 22 may be supported by and suspended from installation head 20 via second mechanism 64 (e.g., compression springs 70), such that installation head 20 and retaining portion 22 may pivot with respect to one another due to engagement of second mechanism 64 (e.g., compression of compression springs 70), thereby normalizing part 14 with respect to target 16 as it is placed within cavity 28.

In examples where second mechanism 64 includes compression springs 70, said compression springs 70 may be spaced apart substantially equidistantly throughout a peripheral region 72 of retaining portion 22 in some examples. For example, a respective compression spring 70 may be positioned within each respective corner region 74 of retaining portion 22. Additionally or alternatively, compression springs 70 may be spaced within outer edge regions 76 and/or within a central area 78 of retaining portion 22. Each retaining portion 22 of device 12 may include 2 or more, 3 or more, 4 or more, 5 or more, 6 or more, 8 or more, 10 or more, and/or 15 or more compression springs 70. In some examples, second mechanism 64 may include similar or different structures to compression springs 70, such as air cylinders or other structures that may be configured to provide the desired self-aligning movement and/or pivoting of retaining portion 22 with respect to installation head 20 and/or with respect to support structure 36. Such air cylinders or other structures may be arranged similarly to compression springs 70, as described.

FIG. 7 illustrates an example of device 12, in the form of device 80, having installation head 20 and retaining portion 22 coupled thereto via compression springs 70. Installation head 20 of device 80 includes first mechanism 62 having first linear bearing rail 66 and first set of bearings 68 that are configured for self-aligning movement of the part in the directions indicated by arrow 30. Forces in one of the directions of movement indicated by arrow 30 (e.g., along a first dimension of the part, such as along the width of the part) transmitted from the part to installation head 20 (when the part is retained by retaining portion 22) result in movement of first set of bearings 68 along first linear bearing rail 66 to self-align the part with respect to the target.

In this example, first mechanism 62 also includes a second linear bearing rail 82 and a second set of bearings 84 engaged with second linear bearing rail 82 such that movement of second set of bearings 84 along second linear bearing 82 rail facilitates movement of installation head 20 along a second dimension (e.g., along the length of the part). For example, second linear bearing rail 82 may be arranged such that it is substantially parallel to the length of the part. Forces along the second dimension (e.g., into the page) transmitted to installation head 20 result in movement of second set of bearings 84 along second linear bearing rail 82. In some examples, movement of second set of bearings 84 along second linear bearing rail 82 may be self-aligning (e.g., automatic, in response to contact between the part and the target when the part is engaged with device 80). In other examples, movement of second set of bearings 84 along second linear bearing rail 82 may be controlled manually (e.g., by an operator), may be controlled remotely, and/or may be controlled by a vision system or other system. As shown in the example of device 80, second linear bearing rail 82 and first linear bearing rail 66 may be arranged substantially perpendicularly to one another, in some examples. In other examples, first linear bearing rail 66 may be arranged at a different angle with respect to second linear bearing rail 82, or first mechanism 62 may include just one of first linear bearing rail 66 and second linear bearing rail 82, in some examples.

Second mechanism 64 of device 80 includes compression springs 70 positioned in corner regions 74 of retaining portion 22. Said compression springs 70 are configured to pivot retaining portion 22 and installation head 20 relative to one another to self-normalize the part as it is operatively placed at the target, and as forces are transmitted to compression springs 70 due to contact between one or more target surfaces 26 and one or more part surfaces 24.

In examples of device 12, 80 having a locking mechanism 34 (FIG. 1), locking mechanism 34 may be configured to selectively (e.g., when engaged) prevent self-aligning movement of installation head 20 via first mechanism 62 and/or second mechanism 64. For example, locking mechanism 34 may be configured to selectively prevent movement of first set of bearings 68 with respect to first linear bearing rail 66. Additionally or alternatively, locking mechanism 34 may be configured to selectively (e.g., when engaged) prevent movement of second set of bearings 84 with respect to second linear bearing rail 82. Additionally or alternatively, locking mechanism 34 may be configured to selectively (e.g., when engaged) prevent compression of compression springs 70, thereby substantially fixing retaining portion 22 with respect to installation head 20.

Figure 8:
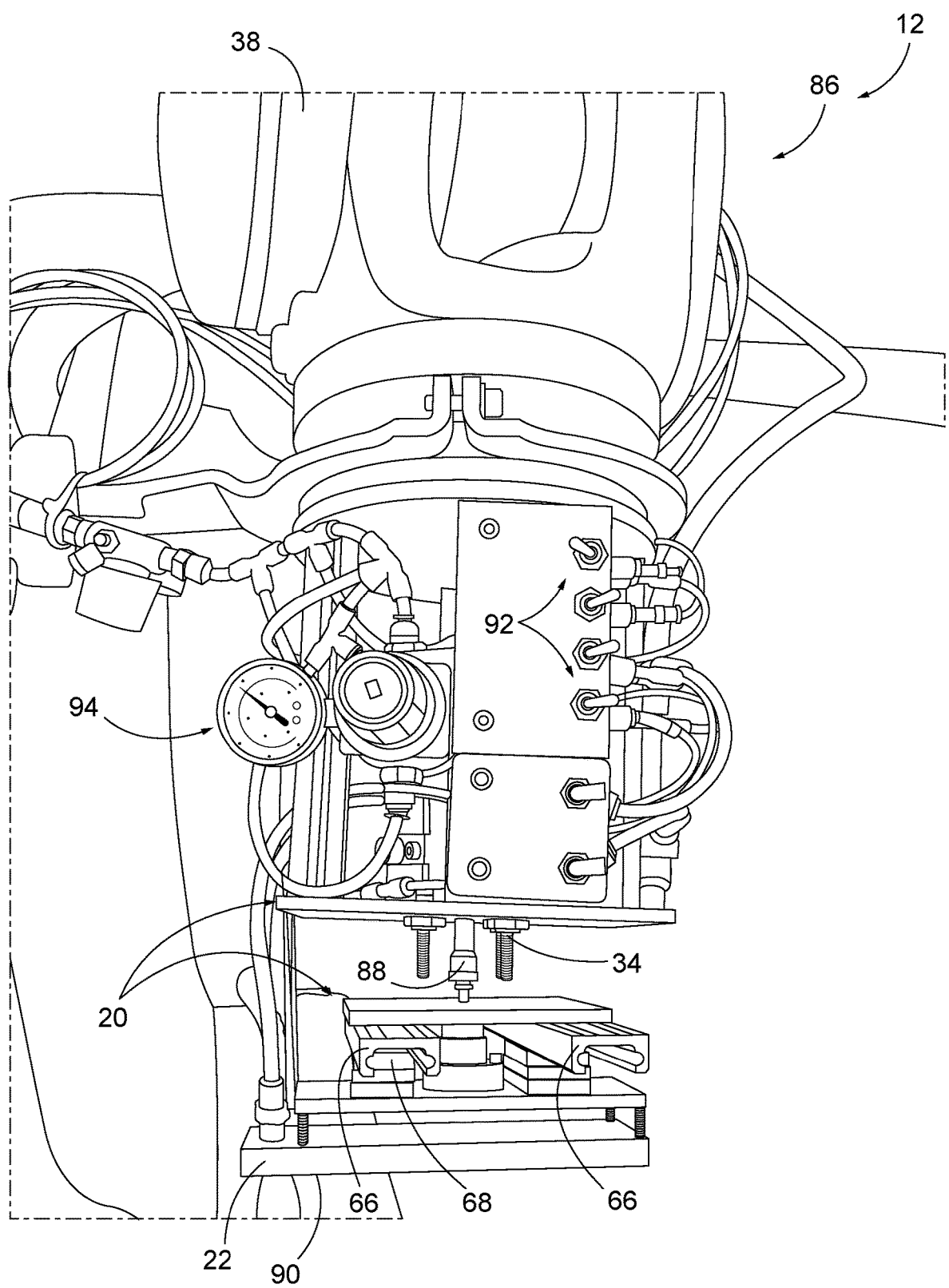
FIG. 8 is an elevation view of one example of a device for placing a part, according to the present disclosure.

FIG. 8 illustrates a device 86, which is another example of device 12, having installation head 20 and retaining portion 22 for placing a part at a target. Installation head 20 of device 86 includes two first linear bearing rails 66 arranged substantially parallel to one another, for self-aligning movement of installation head 20 along a first dimension of the part. In this example, installation head 20 also includes a pivot point 88, which may be, for example, a pivoting ball-and-socket joint, or other pivoting joint. Pivot point 88 may be configured to allow for self-aligning rotation of installation head 20 and retaining portion 22 relative to the target, such as roll, pitch, and/or yaw of the part, about the longitudinal axis of the part (or about a different axis of the part, in some examples). Locking mechanism 34 (which may include one or more locking pneumatic cylinders) may be configured to substantially prevent movement of installation head 20 via pivot point 88 when locking mechanism 34 is engaged. Additionally or alternatively, locking mechanism 34 may be configured to substantially prevent self-aligning movement of installation head 20 via first linear bearing rail 66 and first set of bearings 68 when locking mechanism 34 is engaged.

Device 86 includes a suction device 94 (e.g., a vacuum pump) that may be configured to draw a part against a lower surface 90 of retaining portion 22, thereby supporting and retaining the part in association with retaining portion 22 such that any self-aligning movement of installation head 20 and retaining portion 22 also corresponds to self-aligning movement of the part associated therewith. A plurality of switches 92 (which may be buttons, knobs, dials, or other controls) may be provided on device 86 to selectively control, for example, suction device 94, locking mechanism 34, and/or lowering and/or raising of device 86 towards and/or away from the part and/or the target.

Figure 9:
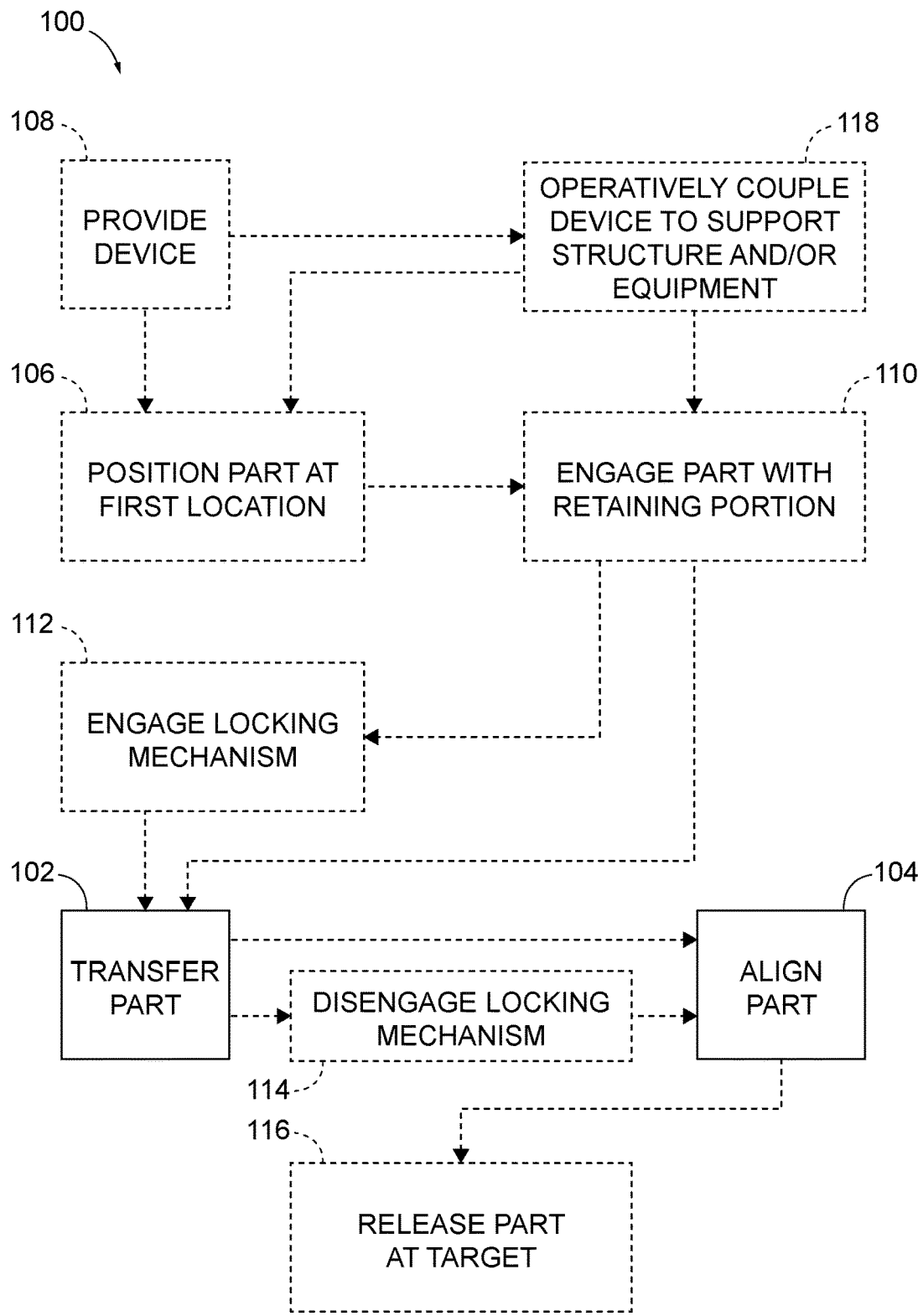
FIG. 9 is a flowchart diagram schematically representing methods for placing a part, according to the present disclosure.

FIG. 9 schematically provides a flowchart that represents illustrative, non-exclusive examples of methods 100 according to the present disclosure. In FIG. 9, some steps are illustrated in dashed boxes indicating that such steps may be optional or may correspond to an optional version of a method according to the present disclosure. That said, not all methods 100 according to the present disclosure are required to include the steps illustrated in solid boxes. The methods and steps illustrated in FIG. 9 are not limiting and other methods and steps are within the scope of the present disclosure, including methods having greater than or fewer than the number of steps illustrated, as understood from the discussions herein.

Methods 100 generally include transferring a part (e.g., part 14) from a first location (e.g., first location 18) towards a target (e.g., target 16) at 102 and automatically aligning the part with the target at 104, as the part is operatively placed with respect to the target via a device and/or system according to the present disclosure (e.g., device 12 and/or system 10). In some specific methods 100, transferring the part at 102 may include transferring the part from a tool to a fuselage assembly for an aircraft, or transferring the part to a mold, a tool, or a mandrel for assembling an aircraft fuselage. Automatically aligning the part with the target at 104 occurs responsive to engagement between one or more part surfaces of the part (e.g., part surfaces 24) and one or more target surfaces of the target (e.g., target surfaces 26), as described above. In some methods 100, aligning the part with the target at 104 includes inserting the part into a receiving cavity (e.g., cavity 28) of the target, with the receiving cavity being defined by one or more target surfaces. Inserting the part into the cavity may cause self-alignment of the part with respect to the cavity, such as by moving the part with respect to the cavity in one or more directions. In some methods 100, self-aligning the part at 104 includes causing self-aligning movement of an installation head (e.g., installation head 20) of the device and the part in a direction substantially perpendicular to the longitudinal axis of the part, due to contact between the part and one or more target surfaces, and/or self-normalization of the part with respect to the cavity due to contact between the part and one or more target surfaces of the cavity (e.g., a lower surface of the cavity). In some methods, aligning the part at 104 is performed by self-aligning movement of one or more mechanisms of the device, such as one or more compression springs and/or one or more linear bearing rails of the device (e.g., compression springs 70 and/or linear bearing rails 66, 82).

Some methods 100 include positioning a part at the first location at 106, such as by positioning the part on a tool and/or support structure (e.g., tool 42 and/or support structure 36). The device may be provided at 108 and a retaining portion of the device (e.g., retaining portion 22) may be engaged with the part via the installation head at 110. In some methods 100, engaging the part at 110 includes coupling the retaining portion to the part, and transferring the part at 102 includes moving the part away from the first location. Additionally or alternatively, engaging the part at 110 may include lowering the installation head and retaining portion towards the part and picking up the part from the first location. In some methods, engaging the part at 110 includes applying a suction force to the part to vertically lift the part off of or away from the first location, such as via a suction device (e.g., suction device 94).

In some methods 100, engaging the part at 110 includes positioning the installation head and the retaining portion with respect to the part, unlocking (e.g., disengaging) the installation head and retaining portion with respect to the part, causing the retaining portion to contact the part and self-align with the part via said contact, and locking the installation head and the retaining portion with respect to the support structure once the part is engaged with the retaining portion. Engaging the part at 110 may include driving the installation head and retaining portion to an initial position with respect to the part, wherein the initial position is near, but not touching the part. The installation head and retaining portion may then be lowered towards the part until the retaining portion contacts the part to engage it at 110.

Some methods 100 include selectively and releasably locking the part into position at 112, such as by engaging a locking mechanism (e.g., locking mechanism 34), thereby substantially preventing self-aligning movement of the installation head. For example, the installation head may be locked into position to keep the part in substantially the same orientation as it is transferred away from the first location at 102. In some examples, when the locking mechanism is engaged at 112, the installation head and retaining portion are substantially fixed in a given orientation with respect to a support structure (e.g., support structure 36) of the system. After the part is transferred towards the target at 102, some methods 100 include disengaging the locking mechanism at 114, thereby allowing self-aligning movement of the installation head and retaining portion (and thereby, the part, as well) as the part is aligned with the target at 104.

In some methods 100, aligning the part with the target at 104 includes providing substantially uniform downward compactive loading to the part through all corners of the retaining portion, as the part is placed at the target, such as by compression springs positioned in corner regions of the retaining portion and extending away from the installation head. Some methods 100 may include mounting the device (e.g., the installation head and retaining portion) to or on the support structure and/or to or on an automated or semi-automated piece of equipment (e.g., equipment 38) at 118, to facilitate movement of the part via the device between the first location and the target, and/or to raise and lower the installation head and retaining portion with respect to the part, a tool at the first location, and/or the target.

Once the part is operatively at the target (e.g., self-aligned with the target and positioned as desired with respect to the target), the part may be released at the target at 116. For example, releasing the part at 116 may include unlocking the retaining portion and/or installation head, and/or removing any vacuum retaining the part such that the part is released from the retaining portion, such that the part remains where it was placed at the target and the device may be removed and drawn away from the part. Generally, the self-aligning the part at 104 is completed before the part is released from the device at 116, though the unlocking the installation head and/or retaining portion may be performed prior to, after, or in conjunction with contacting the target with the part. Such methods 100 may allow for self-alignment of parts with respect to targets (e.g., stringers for aircraft assemblies) that are challenging to align, due to their size and/or shape. Further, such methods 100 may accomplish said self-alignment without requiring the use of vision systems.

Illustrative, non-exclusive examples of inventive subject matter according to the present disclosure are described in the following enumerated paragraphs:

A1. An apparatus for placing a part, the apparatus comprising:

an installation head, wherein the installation head is configured to provide multiple axes of movement of the part relative to a target such that the installation head is configured to automatically align the part with respect to the target, responsive to engagement between one or more part surfaces of the part and one or more target surfaces of the target; and a retaining portion configured to selectively support and retain the part in association with the installation head as the part is moved from a first location towards the target, via the apparatus, wherein the first location is located apart from the target, and wherein the retaining portion is configured to selectively release the part once the part is aligned with and operatively at the target, via the apparatus.

A2. The apparatus of paragraph A1, wherein the installation head comprises a plurality of installation heads spaced apart from one another along a length of the part, and wherein the retaining portion comprises a plurality of retaining portions, each respective retaining portion of the plurality of retaining portions being configured to selectively support and retain the part in association with a respective installation head of the plurality of installation heads.

A3. The apparatus of paragraph A2, wherein the plurality of installation heads are arranged with respect to one another such that they are configured to minimize twisting of the part about a longitudinal axis of the part as it is moved from the first location towards the target.

A4. The apparatus of any of paragraphs A2-A3, wherein each respective installation head of the plurality of installation heads is configured to move relative to and to articulate independently of the other respective installation heads of the plurality of installation heads.

A5. The apparatus of any of paragraphs A2-A4, wherein the plurality of installation heads are linked together.

A6. The apparatus of any of paragraphs A2-A5, wherein the apparatus is configured to selectively move the plurality of installation heads together, relative to the part when the part is not retained by the retaining portion, and relative to the target.

A7. The apparatus of any of paragraphs A2-A6, wherein the apparatus is configured to selectively vertically lower the plurality of installation heads together, towards the first location, and wherein the apparatus is further configured to selectively vertically raise the plurality of installation heads together, away from the first location, while the part is retained by the plurality of retaining portions.

A7.1. The apparatus of paragraph A7, wherein the apparatus is further configured to selectively vertically lower the plurality of installation heads together towards the target, while retaining the part via the plurality of retaining portions.

A7.2. The apparatus of paragraph A7.1, wherein the apparatus is further configured to selectively release the part at the target.

A8. The apparatus of any of paragraphs A2-A7.2, wherein the plurality of installation heads comprises at least 2 installation heads, at least 3 installation heads, at least 4 installation heads, at least 5 installation heads, at least 6 installation heads, at least 8 installation heads, at least 10 installation heads, at least 15 installation heads, and/or at least 20 installation heads.

A9. The apparatus of any of paragraphs A1-A8, wherein the apparatus is configured to place the part at, in, and/or on the target, such that at least one of the one or more part surfaces contacts at least one of the one or more target surfaces.

A10. The apparatus of any of paragraphs A1-A9, wherein the apparatus is configured to selectively pick up the part from the first location, via the retaining portion.

A11. The apparatus of any of paragraphs A1-A10, wherein the retaining portion is configured to selectively and releasably lock the part into position by selectively substantially preventing self-aligning movement of the installation head.

A12. The apparatus of any of paragraphs A1-A11, further comprising a locking mechanism configured to selectively and releasably lock the part into position by selectively substantially preventing self-aligning movement of the installation head.

A13. The apparatus of paragraph A12, wherein the locking mechanism comprises locking air cylinders.

A14. The apparatus of any of paragraphs A1-A13, wherein the installation head comprises a pivoting ball-and-socket joint.

A14.1. The apparatus of any of paragraphs A1-A14, wherein the installation head is configured to provide at least 3 degrees of freedom, at least 4 degrees of freedom, at least 5 degrees of freedom, and/or at least 6 degrees of freedom to self-align the part.

A14.2. The apparatus of any of paragraphs A1-A14.1, wherein the installation head is configured to pitch, roll, and/or yaw to self-align the part.

A14.3. The apparatus of any of paragraphs A1-A14.2, wherein the installation head is configured to allow self-aligning rotation of the part with respect to the target.

A15. The apparatus of any of paragraphs A1-A14.3, wherein the installation head is configured to allow self-aligning movement of the part along a first dimension of the part, via a first mechanism.

A15.1. The apparatus of paragraph A15, wherein the first mechanism comprises a first linear bearing rail and a first set of bearings engaged with the first linear bearing rail, wherein movement of the first set of bearings along the first linear bearing rail facilitates self-aligning movement of the installation head along the first dimension.

A15.2. The apparatus of paragraph A15.1, wherein the first linear bearing rail is arranged substantially parallel to a width of the part.

A15.3. The apparatus of paragraph A15.1 or A15.2, wherein the apparatus is configured such that forces along the first dimension transmitted from the part to the installation head when the part is retained by the retaining portion result in movement of the first set of bearings along the first linear bearing rail.

A15.4. The apparatus of any of paragraphs A15.1-A15.3, wherein a/the locking mechanism of the apparatus is configured to selectively prevent movement of the first set of bearings with respect to the first linear bearing rail when the locking mechanism is engaged.

A15.5. The apparatus of any of paragraphs A15.1-A15.4, wherein the first dimension of the part corresponds with a/the width of the part.

A16. The apparatus of any of paragraphs A1-A15.5, wherein the installation head is configured to allow movement of the part along a second dimension of the part.

A16.1. The apparatus of paragraph A16, wherein the installation head comprises a second linear bearing rail and a second set of bearings engaged with the second linear bearing rail, wherein movement of the second set of bearings along the second linear bearing rail facilitates movement of the installation head along the second dimension.

A16.2. The apparatus of paragraph A16.1, wherein the second linear bearing rail is arranged substantially parallel to a/the length of the part.

A16.3. The apparatus of paragraph A16.1 or A16.2, wherein the second linear bearing rail is arranged substantially perpendicularly to a/the first linear bearing rail.

A16.4. The apparatus of any of paragraphs A16.1-A16.3, wherein the apparatus is configured such that forces along the second dimension transmitted from the part to the installation head when the part is retained by the retaining portion result in movement of the second set of bearings along the second linear bearing rail.

A16.5. The apparatus of any of paragraphs A16.1-A16.4, wherein a/the locking mechanism of the apparatus is configured to selectively prevent movement of the second set of bearings with respect to the second linear bearing rail when the locking mechanism is engaged.

A16.6. The apparatus of any of paragraphs A16.1-A16.5, wherein the second dimension of the part corresponds with a/the length of the part.

A17. The apparatus of any of paragraphs A1-A16.6, wherein the installation head is configured to allow self-aligning movement of the part in a third direction normal to at least one of the one or more target surfaces.

A18. The apparatus of any of paragraphs A1-A17, further comprising a second mechanism configured to self-normalize at least one of the one or more part surfaces with respect to at least one of the one or more target surfaces when placing the part.

A18.1. The apparatus of paragraph A18, wherein the second mechanism comprises one or more compression springs.

A18.2. The apparatus of paragraph A18 or A18.1, wherein the second mechanism comprises one or more air cylinders.

A19. The apparatus of any of paragraphs A18-A18.2, wherein the apparatus is configured such that one or more compression springs are compressed when at least one of the one or more part surfaces contacts at least one of the one or more target surfaces.

A19.1. The apparatus of any of paragraphs A18-A19, wherein the apparatus is configured such that the second mechanism is engaged when at least one of the one or more part surfaces contacts at least one of the one or more target surfaces.

A20. The apparatus of any of paragraphs A1-A19.1, further comprising a support structure configured to support the installation head and the retaining portion.

A21. The apparatus of paragraph A20, wherein the support structure comprises a linear bearing rail structure.

A21.1. The apparatus of paragraph A20 or A21, wherein the installation head and the retaining portion are mechanically linked to the support structure, and wherein the support structure is configured to allow movement of the installation head and the retaining portion in a/the first direction along a/the length of the part and in a/the second direction along a/the width of the part.

A21.2. The apparatus of any of paragraphs A20-A21.1, wherein the support structure is arranged relative to the first location and the target so as to facilitate movement of the installation head and the retaining portion between the first location and the target to move the part towards the target.

A22. The apparatus of any of paragraphs A20-A21.2, wherein the support structure is configured to remain substantially stationary with respect to the target, and wherein the installation head and the retaining portion are configured to selectively move with respect to the support structure as the part is moved from the first location towards the target.

A23. The apparatus of any of paragraphs A1-A22, wherein the retaining portion comprises a vacuum platen.

A24. The apparatus of any of paragraphs A1-A23, wherein the retaining portion is configured to pivot with respect to a/the support structure supporting the installation head and the retaining portion.

A24.1. The apparatus of paragraph A24, wherein the retaining portion is supported and suspended from the installation head such that the retaining portion is configured to pivot with respect to the support structure.

A24.2. The apparatus of paragraph A24.1, wherein one or more compression springs are configured to facilitate pivoting of the retaining portion with respect to the support structure, and wherein the one or more compression springs are spaced apart relative to the retaining portion such that a respective compression spring is positioned within each respective corner region of a plurality of corner regions of the retaining portion.

A24.3. The apparatus of paragraph A24.2, wherein the one or more compression springs are spaced apart substantially equidistantly throughout a peripheral region of the retaining portion.

A25. The apparatus of any of paragraphs A1-A24.3, wherein the installation head is configured to pivot with respect to a/the support structure supporting the installation head and the retaining portion.

A26. The apparatus of any of paragraphs A1-A25, wherein the apparatus is configured such that the installation head and the retaining portion move together with the part, with respect to a/the support structure, as the part is moved from the first location towards the target.

A27. The apparatus of any of paragraphs A1-A26, wherein the retaining portion comprises a suction device, a gripper, a latch, a groove, a vacuum device, and/or any other mechanism configured to selectively and temporarily retain the part to the retaining portion.

A28. The apparatus of any of paragraphs A1-A27, wherein the retaining portion is coupled to the installation head.

A29. The apparatus of any of paragraphs A1-A28, wherein the retaining portion is integrally formed with the installation head.

A30. The apparatus of any of paragraphs A1-A29, wherein the apparatus is configured to install the part at the target by longitudinally translating the part along a/the longitudinal axis of the part, with respect to the target.

A31. The apparatus of any of paragraphs A1-A30, wherein the apparatus is configured to apply substantially uniform downward compactive loading to the part, towards at least one of the one or more target surfaces.

A32. The apparatus of any of paragraphs A1-A31, wherein the apparatus is configured to pick up the part in a plurality of different orientations relative to the apparatus.

A33. The apparatus of any of paragraphs A1-A32, further comprising a plurality of base supports positioned along a/the length of the part configured to prevent twisting of the part about a/the longitudinal axis of the part during movement of the part from the first location to the target.

A34. The apparatus of any of paragraphs A1-A33, wherein the apparatus is configured to be mounted on an automated or semi-automated piece of equipment configured to selectively move the part, via the apparatus, between the first location and the target.

A35. The apparatus of any of paragraphs A1-A34, wherein the apparatus is configured to perform a pick-and-place operation with the part.

B1. A system for placing a part, the system comprising: the apparatus of any of paragraphs A1-A35.

B2. The system of paragraph B1, further comprising the part.

B3. The system of paragraph B2, wherein the part comprises a stringer for an aircraft.

B4. The system of any of paragraphs B2-B3, wherein the part comprises a composite laminate part.

B5. The system of any of paragraphs B2-B4, wherein the part is semi-flexible, semi-rigid, rigid, or flexible.

B6. The system of any of paragraphs B2-B5, wherein the part comprises a partially cured composite structure.

B7. The system of any of paragraphs B2-B6, wherein the part has a substantially trapezoidal cross-sectional area.

B8. The system of any of paragraphs B2-B7, wherein the part has an elongated shape.

B9. The system of any of paragraphs B2-B8, wherein the part comprises one or more three-dimensional contours along a/the length of the part.

B10. The system of any of paragraphs B2-B9, wherein the part is at least 5 feet (1.5 meters) long at least 10 feet long (3 meters), at least 15 feet long (4.5 meters), at least 20 feet long (6 meters), at least 30 feet long (9 meters), and/or at least 50 feet long (15 meters).

B11. The system of any of paragraphs B2-B10, wherein the one or more part surfaces comprise one or more angular side surfaces arranged at non-perpendicular and non-parallel angles with respect to one another.

B12. The system of any of paragraphs B1-B11, further comprising an/the automated or semi-automated piece of equipment configured to selectively move the part, via the apparatus, between the first location and the target.

B13. The system of paragraph B12, wherein the automated or semi-automated piece of equipment comprises an industrial robot.

B14. The system of any of paragraphs B1-B13, wherein the system is configured to perform a pick-and-place operation.

B15. The system of any of paragraphs B1-B14, wherein the system is numerically controlled.

B16. The system of any of paragraphs B1-B15, further comprising the target.

B17. The system of paragraph B16, wherein the target comprises an assembly for an/the aircraft.

B18. The system of any of paragraphs B16-B17, wherein the target comprises a fuselage for an/the aircraft.

B18.1. The system of any of paragraphs B16-B18, wherein the target comprises a mold or tool for an/the aircraft.

B18.2. The system of any of paragraphs B16-B18.1, wherein the target comprises a mandrel configured for assembling an aircraft fuselage.

B19. The system of any of paragraphs B16-B18.2, wherein the one or more target surfaces of the target are complementary to the one or more part surfaces of the part.

B19.1. The system of any of paragraphs B16-B19, wherein the target is configured to receive the part within a cavity defined by the one or more target surfaces.

B20. The system of any of paragraphs B16-B19.1, wherein the target comprises a stringer trough configured to receive the part.

B21. The system of any of paragraphs B16-B20, wherein the target comprises a cavity having a trapezoidal cross-sectional area.

C1. An aircraft comprising a part installed using the apparatus of any of paragraphs A1-A35 and/or the system of any of paragraphs B1-B21.

D1. A method for placing a part, the method comprising: transferring the part from a first location towards a target; and
automatically aligning the part with the target as the part is operatively placed with respect to the target, responsive to engagement between one or more part surfaces of the part and one or more target surfaces of the target.

D2. The method of paragraph D1, wherein the transferring the part and the automatically aligning the part are performed by the apparatus of any of paragraphs A1-A35.

D3. The method of any of paragraphs D1-D2, wherein the transferring the part and the automatically aligning the part are performed by the system of any of paragraphs B1-B21.

D4. The method of any of paragraphs D1-D3, further comprising positioning the part at the first location.

D5. The method of paragraph D4, wherein the positioning the part at the first location comprises positioning the part on a tool.

D6. The method of any of paragraphs D1-D5, further comprising engaging the part with a/the retaining portion via an/the installation head.

D7. The method of paragraph D6, wherein the engaging the part comprises coupling the retaining portion to the part, and wherein the transferring the part comprises moving the part away from the first location.

D8. The method of paragraph D6 or D7, wherein the engaging the part comprises lowering the installation head and the retaining portion towards the part and picking up the part from the first location.

D9. The method of any of paragraphs D6-D8, wherein the engaging the part comprises applying a suction force to the part to vertically lift the part off of the first location.

D10. The method of any of paragraphs D6-D9, wherein the engaging the part comprises selectively and releasably locking the part into position by selectively substantially preventing self-aligning movement of the installation head.

D11. The method of any of paragraphs D6-D10, wherein the engaging the part comprises locking the installation head and the retaining portion in a given orientation with respect to a/the support structure.

D11.1. The method of any of any of paragraphs D6-D11, wherein the engaging the part comprises:
positioning the installation head and the retaining portion with respect to the part;
unlocking the installation head and the retaining portion with respect to the part;
causing the retaining portion to contact the part, wherein the retaining portion self-aligns with respect to the part when the retaining portion contacts the part; and
locking the installation head and the retaining portion with respect to a/the support structure.

D11.2. The method of paragraph D11.1, wherein the positioning the installation head and the retaining portion comprises driving the installation head and the retaining portion to an initial position with respect to the part, wherein the initial position is near, but not touching the part.

D11.3. The method of paragraph D11.1 or D11.2, wherein the causing the retaining portion to contact the part comprises lowering the retaining portion towards the part until the retaining portion contacts the part.

D12. The method of any of paragraphs D1-D11.3, further comprising releasing the part at the target.

D13. The method of paragraph D12, wherein the releasing the part is performed after the automatically aligning the part with respect to the target.

D14. The method of any of paragraphs D12-D13, wherein the releasing the part comprises unlocking the part to release it from a/the retaining portion.

D15. The method of any of paragraphs D1-D14, wherein the automatically aligning the part comprises unlocking a/the installation head and/or a/the retaining portion with respect to a/the support structure such that the installation head and the retaining portion may self-align with the target.

D16. The method of any of paragraphs D1-D15, wherein the transferring the part from the first location to the target comprises transferring the part from a tool to a fuselage assembly for an aircraft.

D16.1. The method of any of paragraphs D1-D16, wherein the transferring the part from the first location to the target comprises transferring the part from a tool to a mold, a tool, or a mandrel for assembling an aircraft fuselage.

D17. The method of any of paragraphs D1-D16.1, further comprising unlocking a/the installation head and a/the retaining portion with respect to a/the support structure.

D17.1. The method of paragraph D17, wherein the unlocking the installation head and the retaining portion is performed prior to the automatically aligning the part with the target.

D17.2. The method of paragraph D17, wherein the automatically aligning the part with the target comprises contacting the target with the part.

D17.3. The method of paragraph D17.2, wherein the unlocking the installation head and the retaining portion is performed prior to the contacting the target with the part.

D17.4. The method of paragraph D17.2, wherein the unlocking the installation head and the retaining portion is performed subsequent to the contacting the target with the part.

D18. The method of any of paragraphs D1-D17.4, wherein the automatically aligning the part with the target comprises inserting the part into a receiving cavity of the target, the receiving cavity being formed by one or more target surfaces.

D19. The method of paragraph D18, wherein the inserting the part into the receiving cavity causes self-alignment of the part with respect to the receiving cavity in a first direction substantially perpendicular to a/the longitudinal axis of the part, due to contact between the part and one or more target surfaces.

D20. The method of paragraph D18 or D19, wherein the inserting the part into the receiving cavity comprises contacting the part with a lower surface of the receiving cavity, and wherein the contacting the part with the lower surface of the receiving cavity causes self-normalization of the part with respect to the lower surface, via one or more compression springs of the installation head.

D21. The method of any of paragraphs D1-D20, further comprising providing substantially uniform downward compactive loading to the part through all corners of a/the retaining portion, as the part is placed at the target.

D21.1. The method of any of paragraphs D1-D21, further comprising providing substantially uniform downward compactive loading to the part through a peripheral region of a/the retaining portion, as the part is placed at the target.

D22. The method of any of paragraphs D1-D21.1, further comprising providing a/the apparatus configured to transfer and automatically align the part with respect to the target.

D23. The method of paragraph D22, further comprising mounting the apparatus on an automated or semi-automated piece of equipment to cause movement of the part, via the apparatus, between the first location and the target and/or to raise and lower a/the installation head and a/the retaining portion of the apparatus with respect to the part, a/the tool, and/or the target.

D24. The method of any of paragraphs D1-D23, wherein the automatically aligning the part is performed without the use of a vision system.

E1. The use of the apparatus of any of paragraphs A1-A35 to place the part with respect to the target.

E2. The use of the apparatus of any of paragraphs A1-A35 to place the part with respect to the target, wherein the part comprises a stringer for an aircraft, and wherein the target comprises a fuselage for the aircraft.

E3. The use of the apparatus of any of paragraphs A1-A35 to place the part with respect to the target, wherein the part comprises a stringer for an aircraft, and wherein the target comprises a mold, a tool, or a mandrel for assembling an aircraft fuselage.

F1. The use of the system of any of paragraphs B1-B21 to place the part with respect to the target.

F2. The use of the system of any of paragraphs B1-B21 to place the part with respect to the target, wherein the part comprises a stringer for an aircraft, and wherein the target comprises a fuselage for the aircraft.

F3. The use of the system of any of paragraphs B1-B21 to place the part with respect to the target, wherein the part comprises a stringer for an aircraft, and wherein the target comprises a mold, a tool, or a mandrel for assembling an aircraft fuselage.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An apparatus for placing a part, the apparatus comprising:
   an installation head, wherein the installation head is configured to provide multiple axes of movement of the part relative to a target such that the installation head is configured to automatically align the part with respect to the target, responsive to engagement between one or more part surfaces of the part and one or more target surfaces of the target, wherein the installation head comprises:
      a first mechanism configured to facilitate self-aligning movement of the installation head along a first dimension of the part, wherein the installation head is configured to self-align the part in a direction normal to at least one of the one or more target surfaces; and
      a second mechanism configured to self-normalize the part with respect to at least one of the one or more target surfaces when placing the part, wherein the apparatus is configured such that the second mechanism is engaged when at least one of the one or more part surfaces contacts at least one of the one or more target surfaces; and
   a retaining portion configured to selectively support and retain the part in association with the installation head as the part is moved from a first location towards the target, via the apparatus, wherein the first location is located apart from the target, wherein the retaining portion is configured to selectively release the part once the part is automatically aligned with and operatively at the target, via the apparatus.

2. The apparatus according to claim 1, wherein the installation head comprises a plurality of installation heads spaced apart from one another along a length of the part, wherein the retaining portion comprises a plurality of retaining portions, each respective retaining portion of the plurality of retaining portions being configured to selectively support and retain the part in association with a respective installation head of the plurality of installation heads, and wherein each respective installation head of the plurality of installation heads is configured to move relative to and to articulate independently of other respective installation heads of the plurality of installation heads.

3. The apparatus according to claim 2, wherein the plurality of installation heads are linked together such that the apparatus is configured to selectively move the plurality of installation heads together, relative to the part when the part is not retained by the retaining portion, and relative to the target.

4. The apparatus according to claim 1, wherein the apparatus is configured to selectively pick up the part from the first location, via the retaining portion, and wherein the apparatus is configured to place the part at the target, such that at least one of the one or more part surfaces contacts at least one of the one or more target surfaces.

5. The apparatus according to claim 1 further comprising a locking mechanism configured to selectively and releasably lock the part into position by selectively substantially preventing self-aligning movement of the installation head, wherein the locking mechanism is configured to selectively prevent activation of the first mechanism when the locking mechanism is engaged.

6. The apparatus according to claim 1 wherein the retaining portion is supported and suspended from the installation head via the second mechanism such that the retaining portion is configured to pivot with respect to the installation head.

7. The apparatus according to claim 6, wherein the second mechanism comprises one or more compression springs that are spaced apart relative to the retaining portion such that each respective compression spring is positioned substantially equidistantly from adjacent respective compression springs within a peripheral region of the retaining portion.

8. The apparatus according to claim 1, wherein the apparatus is configured to apply substantially uniform downward compactive loading to the part, towards at least one of the one or more target surfaces.

9. A system for placing a part, the system comprising:
an apparatus, comprising:
- an installation head, wherein the installation head is configured to provide multiple axes of movement of the part relative to a target such that the installation head is configured to automatically align the part with respect to the target, responsive to engagement between one or more part surfaces of the part and one or more target surfaces of the target, wherein the installation head comprises:
  - a first mechanism configured to facilitate self-aligning movement of the installation head along a first dimension of the part, wherein the installation head is configured to self-align the part in a direction normal to at least one of the one or more target surfaces; and
  - a second mechanism configured to self-normalize the part with respect to at least one of the one or more target surfaces when placing the part, wherein the apparatus is configured such that the second mechanism is engaged when at least one of the one or more part surfaces contacts at least one of the one or more target surfaces; and
  - a retaining portion configured to selectively support and retain the part in association with the installation head as the part is moved from a first location towards the target, via the apparatus, wherein the first location is located apart from the target, wherein the retaining portion is configured to selectively release the part once the part is automatically aligned with and operatively at the target, via the apparatus; and the part.

10. The system according to claim 9, wherein the part comprises a stringer for an aircraft.

11. The system according to claim 10, further comprising the target, wherein the target comprises a mandrel for assembling an aircraft fuselage, and wherein the one or more target surfaces of the target are complementary to the one or more part surfaces of the part such that the target is configured to receive the part within a cavity defined by the one or more target surfaces.

12. A method for placing a part, the method comprising:
engaging the part with a retaining portion via an installation head, wherein the engaging the part is performed while the part is located at a first location, wherein the installation head is configured to provide multiple axes of movement of the part relative to a target such that the installation head is configured to automatically align the part with respect to the target, responsive to engagement between one or more part surfaces of the part and one or more target surfaces of the target, wherein the retaining portion is configured to selectively support and retain the part in association with the installation head as the part is moved from the first location towards the target, and wherein the first location is located apart from the target;
transferring the part from the first location towards the target;
automatically aligning the part with the target as the part is placed with respect to the target, responsive to engagement between one or more part surfaces of the part and one or more target surfaces of the target, wherein the automatically aligning the part comprises:
moving the installation head along a first dimension of the part via a first mechanism of the installation head, wherein the first mechanism is configured to facilitate self-aligning movement of the installation head along the first dimension of the part such that the installation head is configured to self-align the part in a direction normal to at least one of the one or more target surfaces; and
self-normalizing the part with respect to at least one of the one or more target surfaces when placing the part, via a second mechanism of the installation head, wherein the second mechanism is engaged when at least one of the one or more part surfaces contacts at least one of the one or more target surfaces; and
releasing the part from the retaining portion to place the part at the target, wherein the releasing the part is performed once the part is operatively at the target and after the automatically aligning the part with respect to the target.

13. The method according to claim 12, wherein the engaging the part comprises:
driving the installation head and the retaining portion to an initial position with respect to the part, wherein the initial position is near, but not touching the part; and
causing the retaining portion to contact the part, wherein the retaining portion self-aligns with respect to the part when the retaining portion contacts the part.

14. The method according to claim 13, further comprising locking the installation head and the retaining portion to maintain an orientation of the part during the transferring the part towards the target, wherein the locking the installation head and the retaining portion is performed after the engaging the part with the installation head.

15. The method according to claim 14, further comprising unlocking the installation head such that the installation head and the retaining portion may self-align the part with the target.

16. The method according to claim 12, wherein the transferring the part from the first location towards the target comprises transferring the part from a tool to a fuselage assembly for an aircraft, wherein the part is a stringer for the aircraft.

17. The method according to claim 12, wherein the automatically aligning the part with the target comprises inserting the part into a receiving cavity of the target, the receiving cavity being formed by one or more target surfaces, wherein the inserting the part into the receiving cavity causes self-alignment of the part with respect to the receiving cavity perpendicularly to a longitudinal axis of the part, due to contact between the part and one or more target surfaces, and wherein the inserting the part into the receiving cavity comprises contacting the part with a lower surface of the receiving cavity, and wherein the contacting the part with the lower surface of the receiving cavity causes self-normalization of the part with respect to the lower surface, via one or more compression springs of the installation head.

* * * * *